Figures 1, 2:
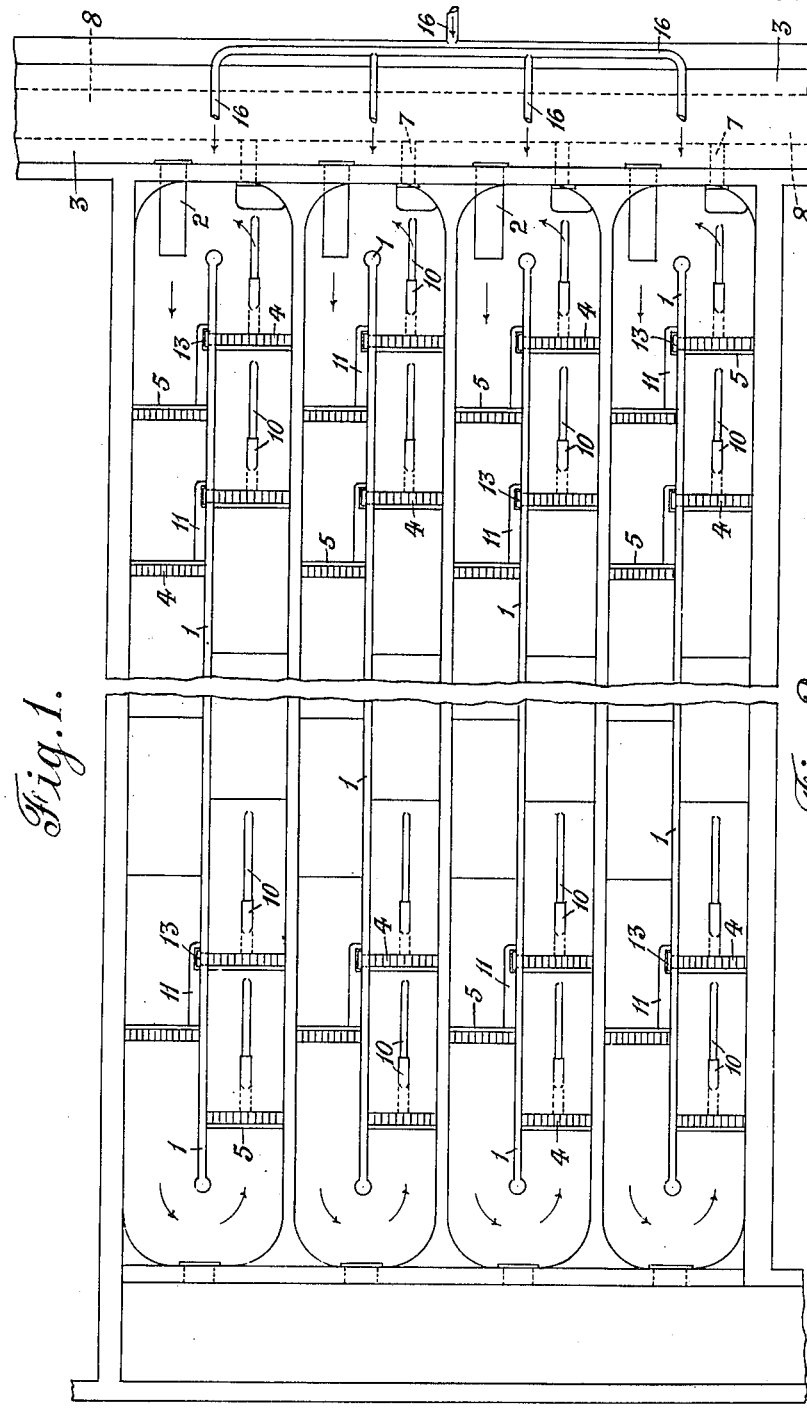

W. JONES.
PURIFICATION OF SEWAGE AND ANALOGOUS LIQUIDS.
APPLICATION FILED OCT. 18, 1915.

1,286,017.

Patented Nov. 26, 1918.
5 SHEETS—SHEET 1.

Inventor
W. Jones

W. JONES.
PURIFICATION OF SEWAGE AND ANALOGOUS LIQUIDS.
APPLICATION FILED OCT. 18, 1915.

1,286,017.

Patented Nov. 26, 1918.
5 SHEETS—SHEET 3.

W. JONES.
PURIFICATION OF SEWAGE AND ANALOGOUS LIQUIDS.
APPLICATION FILED OCT. 18, 1915.

1,286,017.

Patented Nov. 26, 1918.

Inventor
W. Jones

W. JONES.
PURIFICATION OF SEWAGE AND ANALOGOUS LIQUIDS.
APPLICATION FILED OCT. 18, 1915.

1,286,017. Patented Nov. 26, 1918.

UNITED STATES PATENT OFFICE.

WALTER JONES, OF STOURBRIDGE, ENGLAND.

PURIFICATION OF SEWAGE AND ANALOGOUS LIQUIDS.

1,286,017.  Specification of Letters Patent.  Patented Nov. 26, 1918.

Application filed October 18, 1915. Serial No. 56,536.

*To all whom it may concern:*

Be it known that I, WALTER JONES, a subject of the King of England, residing at Stourbridge, in the county of Worcester, England, have invented new and useful Improvements in and Connected with the Purification of Sewage and Analogous Liquids, of which the following is a specification.

This invention has reference to systems of purifying sewage and analogous impure liquids, in which the purification is effected by the action of aerobic bacteria, or other similar forms of germ life upon the sewage or liquid; and it relates moreover, mainly to such systems wherein the sewage or liquid to be purified is introduced into a tank or vessel, and is subjected to the action of air delivered into it in small bubbles.

The objects and effects of the present invention are generally to provide improvements in connection with such systems of sewage or analogous liquid purification, by which, in practice, the system can be carried out at a high rate of purification of a given quantity of sewage, and efficiency in all respects; with ease and convenience; and with economy of plant, power, and labor.

In the system of purification of sewage, the cultivation of the aerobic bacteria may in the beginning, be effected by taking raw sewage or liquid, and forcing air through it in small bubbles—the air entering into solution in the liquid—and circulating in and distributing and keeping distributed the sludge, in a treating tank; then after a certain time of this treatment, allowing what sludge or solid matters which exist, to deposit, and then running off the liquid above it. And after this, further charges of sewage are introduced and treated in the same way, with the result that a sludge is gradually produced which will contain such bacteria, and in such quantity and condition, that the purification of sewage subsequently will be very effectively and relatively very rapidly accomplished. This culture and collection of activated sludge may be effected in the tank in which the purification of the sewage is to be carried on; or it may be produced in a separate tank, and then transferred to the purification tank; or some sludge which accumulates in percolating filters may be taken in the first instance and added to some sewage and treated by air and in the manner just described for the cultivation and collection of activated sludge.

With regard to the quantity of sludge retained in the tank this will be a very substantial quantity, say from one fifth to one third, or over, of the total quantity of sewage used, and this quantity will be always retained; while the surplus sludge produced, over and above this quantity, or the maximum required as it accumulates in the process, will be periodically discharged from the tanks, leaving the permanent quantity.

In carrying on the process of purification, the required quantity of active sludge will be in the tank. The raw sewage is then run until the tank is filled to the required level, which will take a certain period. The sewage will then be subjected to aeration from say one hour to five hours or more, according to the quality of the sewage, temperature, et cetera, and circumstances; and when so treated, the air supply will be stopped and the sewage rendered quiescent, and the sludge and bacteria will fall to and deposit at the bottom. This period of rest will be from about one hour to two hours. The purified liquid above the deposited sludge will be quietly drawn off in any suitable way; and this drawing off is preferably commenced at the early part of the rest period, it being taken off from the upper layer of liquid by a floating draw off device, or lowering weirs, or the like.

The method, therefore, of operation is having or retaining in the tank or vessel a quantity of activated sludge; introducing a charge of raw sewage liquid; forcing air into the lower part of the tank at points so that a constant distribution and circulation of sludge and bacteria and liquid takes place throughout the tank; then cutting off supply air, and giving the contents a period of quiescence, and depositing the sludge; drawing off the liquid above the sludge (or a portion of it); and periodically or continuously running from the tank a portion of the sludge above that required.

The air supplying means or diffusers in the bottom of the tank are placed at intervals so as to cause a local lifting of the liquid, and a local return to the bottom, and thence a re-lifting, and so complete circulation and re-distribution throughout, and so a uniform and rapid action and purification.

An advantageous arrangement of plant, and mode of manipulation or treatment of the liquid consists in circulating it through a tank, and causing it to traverse or flow through it, a plurality of times, supplying the air to it from the bottom through a plurality of air supplying means or diffusers spaced apart at certain intervals, by which the bacteria are refreshed, and kept in a highly active state, and the liquid is circulated up and down, and the sludge and bacteria distributed and kept so, uniformly through the liquid.

The tank is adapted to be filled and emptied more or less, at intervals, and the raw sewage and liquid are delivered from a carrier or channel into it at a considerable distance above the bottom and in the direction of longitudinal circulation required, so that when it is filled, there will be a longitudinal circulation through the tank at a high velocity of the whole contents. This circulation is promoted and adapted to be continued by the air supply at different points in the bottom of the tank, which will be of endless form, which causes it to rise and then flow along (the air being liberated at the surface), and these actions and effects are repeated all along or around the tank.

Figure 3:
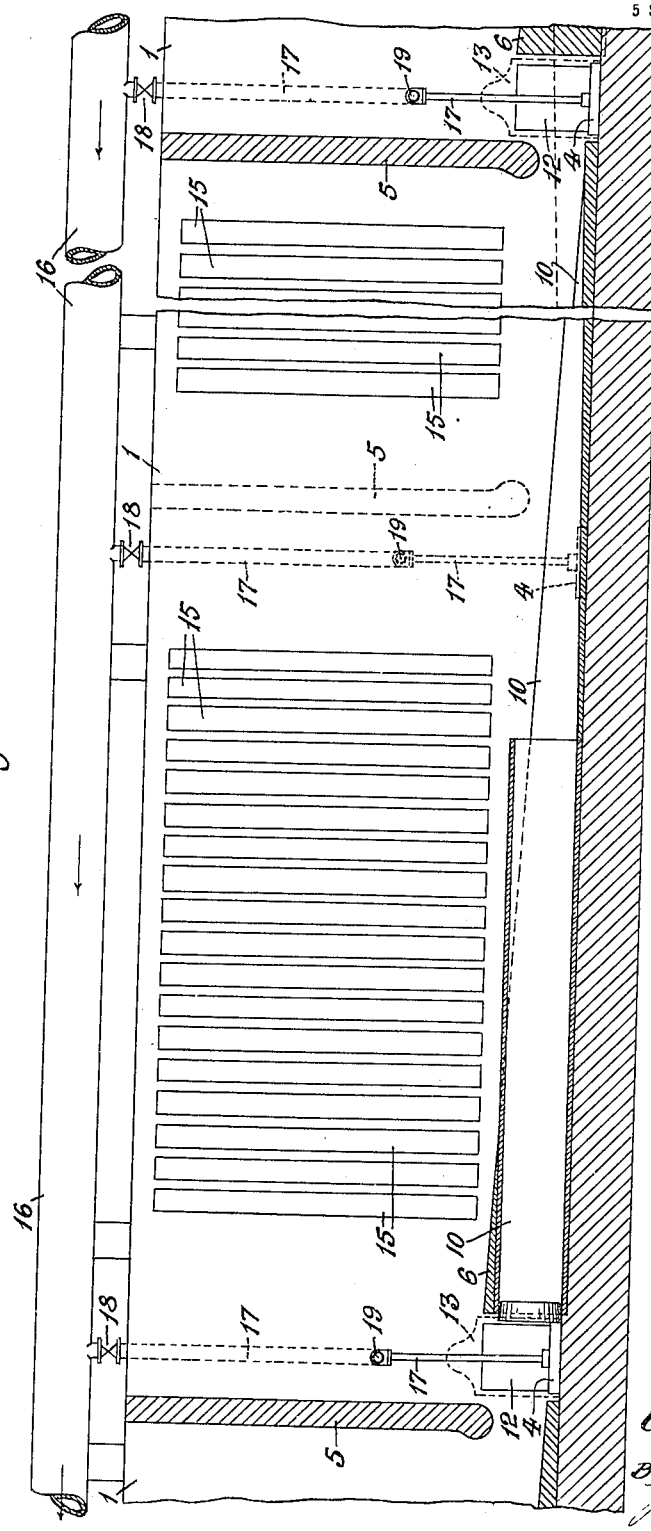
Figure 4:
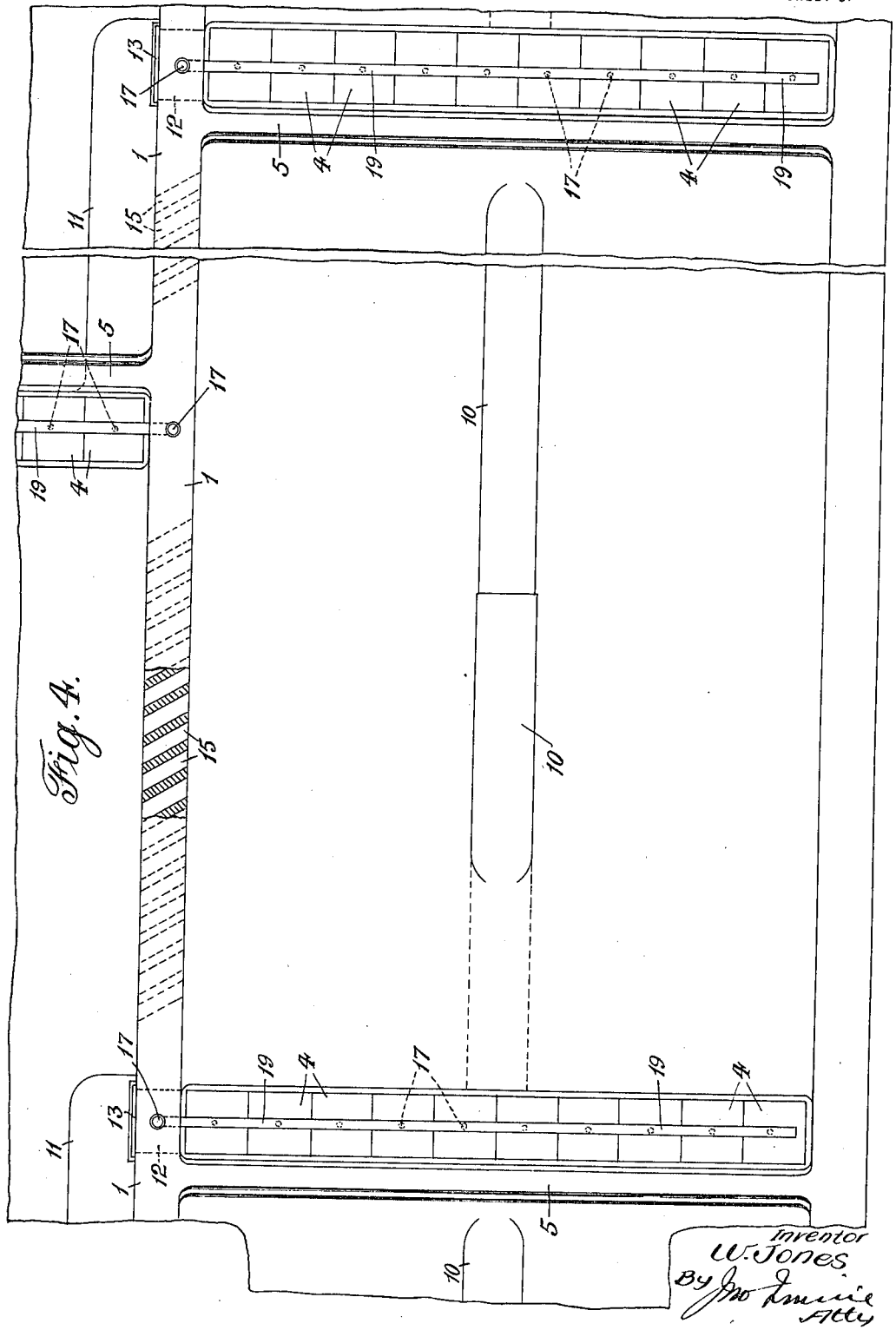

The invention will be further described in connection with the accompanying drawings. In the drawings Figure 1 is a plan, and Fig. 2 a longitudinal section showing a construction of tank; and Figs. 3 and 4 are elevation and plan illustrating in detail the construction of parts of the tank. Figs. 5 to 8 show in diagram, respectively, different forms of closed tanks operating according to the invention.

The tanks are of endless form, and consist of two parts or lengths separated by a division wall 1 in the center, and relatively long to the width, so that longitudinal circulation takes place in opposite directions on opposite sides of the division wall, it being turned around or reversed at its ends. Into one of the parts or channels of the tank, the inflow takes place, it being delivered to it through the pipe 2 from the general supply channel 3, which will supply all the tanks, of which there are a plurality in parallel.

The supply pipes 2 for the raw sewage, are placed in the upper parts of the tanks at a considerable distance above the bottom, and in the direction of longitudinal circulation; so that when the tank is being filled, by this arrangement a longitudinal circulation of the whole contents at a high velocity will take place; and this circulation is promoted and continued, by the action of the air from the air diffusers 4, in the manner hereinafter described.

The tanks are formed in a series of sections, the bottoms of which are inclined downward, as shown in Fig. 3 hereinafter described, and the downward inclination of these sections is in the direction of flow; and just on the upside of the air supplying diffusers 4, there are transverse curtain walls 5, and the high end 6 of each section of the bottom is just in front of the air diffusers 4, which extend across the tank from side to side; and the air—in small bubbles—is discharged into the liquid between the planes of the curtain walls 5 and the high ends 6 of the next succeeding bottom part, and lifts it up between these planes; and the liquid being charged with minute bubbles of liquid, it is lighter than solid liquid, and so it rises to a higher level than the liquid on the upsides of the curtain walls, which at this point will be ridded of air. The high level to which this air charged liquid will rise, therefore, promotes the circulation of the liquid longitudinally; and this takes place section by section, consecutively. The air, therefore, beyond its biological and distributive effects, constitutes a species of pump at the leading end of each section of the tanks for raising the level of the liquid, and forcing it along, and circulating it.

There are in the length of the tank a multiplicity of air supplying means 4, which are, as stated, of such a character as to deliver the air in very small bubbles, such as would be accomplished by forcing it through porous stone or other body; and these air supply diffusers or means extend across the bottom of the tanks from wall to wall.

Furthermore in this arrangement the bottom of the tank generally will be inclined as a whole, from the left hand end to the right, on both sides of the partition wall 1; that is from one end to the other the level of the diffusers 4, and the tops 6 of the section bottoms, will be consecutively lower; and a part of the accumulated sludge (or the whole of it if desired) will be carried off as and when required through a pipe 7, having a penstock on it, and discharging into a sludge culvert 8 under the feed channel 3; so that this discharge pipe is at the same end as the inlet.

In the return half or part of the tank, the sludge to be removed is conducted from section to section through conduits 10; the upper parts of which are in the form of tunnels in the masonry of the bottom, while the lower parts are open channels; and the sludge from the other part or channel of the tank is conducted to the channels 10 from the channels 11, which lie next the wall 1, through openings 12 in the wall, governed by penstocks 13, which are normally closed, and only open when it is desired to draw off a quantity of sludge. Thus the sludge passes from the lower parts of the various sections of the tank, from one section to the other, through the higher part of the next in series, and so on throughout the sections to the general discharge 7.

The partition wall 1 of the tank is provided with spaces 15, which extend vertically from near the top to near the bottom, to allow of a free passage of the sludge and top water in the different sections, and thus the required condition and level of liquid in the tank throughout is maintained.

These openings 15 are vertically and obliquely arranged in the wall, the direction of inclination being toward the direction of flow, and not against it, so that the longitudinal circulation is not interfered with.

With a tank of this construction, the sludge will be carried right around it, and be uniformly distributed, and the inflowing sewage through the pipe 2 will cause a thorough mixture of the sludge with it, and the over-depositing of the sludge at one end or part of the tank will be prevented. And even although the depth of the tank is unequal at different parts, as the liquid can be circulated several times around the tank during the filling and aerating period, a greater depth of sludge in one place will not affect the general result. Further, it is desirable that the particles of sludge should travel all over the tank, and not remain local; and by the arrangement of circulating channel tank described, and by the mode of manipulation and treatment, this is accomplished.

In the construction shown, the air is supplied to the tank from one end through pipes 16, some of which lie above the division wall 1; and from these, air is led to the diffusers 4 by branches 17, having cocks 18 on them. The upper parts of the pipes 17 pass down through the division wall to a point 19, which will be above the sludge level; and then from here they pass to the outside surface of the wall, and extend down on the outside to the diffusers; and the two parts of this pipe 17 will be connected together by a suitable readily attachable and detachable coupling at 19. Thus the upper parts of the pipes 17 will be protected, and will not be liable to corrosion; and when it is desired to attend to or renew or repair the diffusers 4, to which the lower part of the pipe 17 is connected, this lower part can be readily detached from the upper part, and the diffuser cases or bodies, which may just lie in suitable recesses in the tank bottom, can be easily lifted up above the bottom by an overhead traveling crane, and be repaired or attended to.

In the case of the bottom of the tank as a whole, being inclined as above referred to, the head over the different diffusers or air suppliers will vary in series; and to obviate different quantities of air being supplied at different points, the diffusers may differ in porosity in sequence, so that an equal supply of air throughout may be delivered into the liquid. Or they may differ in area, in sequence.

The diffusers instead of being of porous earthenware or like solid body for breaking the air up and delivering it into the liquid in minute globules, may in some cases consist of cocoanut or other textile fiber or fabric introduced into non-corrodible metal or other perforated box or chest or conduit; or textile fabric may be placed and held over a perforated plate in the air box or chest or conduit. Or again, lead wool or ribbonite of a non-corrodible metal may be employed for the purpose.

The course of the sewage will be traced through one tank. From the inlet or supply pipe 2, the incoming sewage will be delivered to the tank on one side of the partition therein, and in the direction of circulation. Initially this sewage flows down the inclined bottom of the first section, to and beneath the first curtain wall 5. Just beyond such wall, the material is met by the first air supplying diffuser 4, and lifted onto the adjacent and highest end of the next immediate downwardly and forwardly inclined bottom of the next section, and so on around the tank. The aeration and circulation is thus secured. It is necessary, however, to remove a portion of the treated sludge or solid matter, as explained. For this purpose, the solid matter to be removed will accumulate in channels 11 on the ingoing side of the partition, and on opening of the penstock 13, such accumulated solid matter will be delivered directly to a position above the particular air diffuser 4 located in the outgoing side of the tank opposite the particular channel 11. The material so delivered from the channels 11, will flow through the channels 10, formed in the bottoms of the sections of the outgoing side of the tank, thus free of the air lifting influence, and discharges as solid matter from the tank outlet. The channels thus provide a means whereby the accumulated sludge of the sections of the ingoing side of the tank, may be drawn off at will and delivered directly to the outgoing side of the tank, when necessary.

In some cases the tanks may be closed, and tanks of this character are shown in Figs. 5 to 8; and the air freed at the surface of the liquid in the first closed tank is led to the air diffuser or diffusers in the bottom of the second tank, and so on through a series of tanks, if desired. In this case the last tank may be open; or in some cases the air liberated in the last tank may be carried by a pipe to a shaft or other point of discharge.

Figure 5:
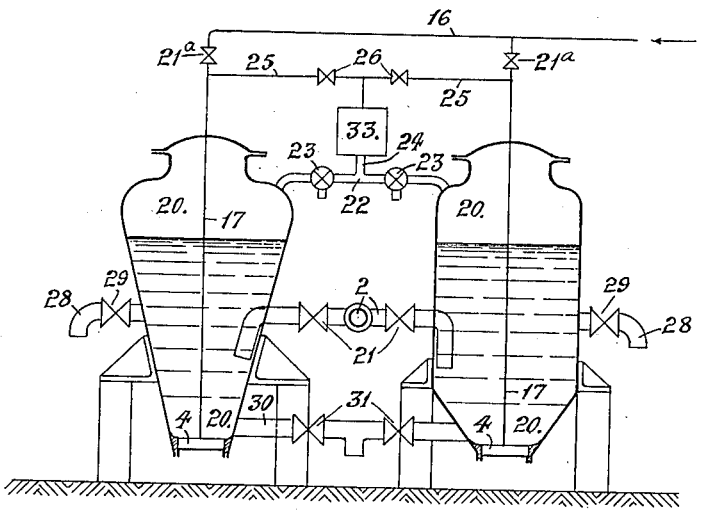
Figure 6:
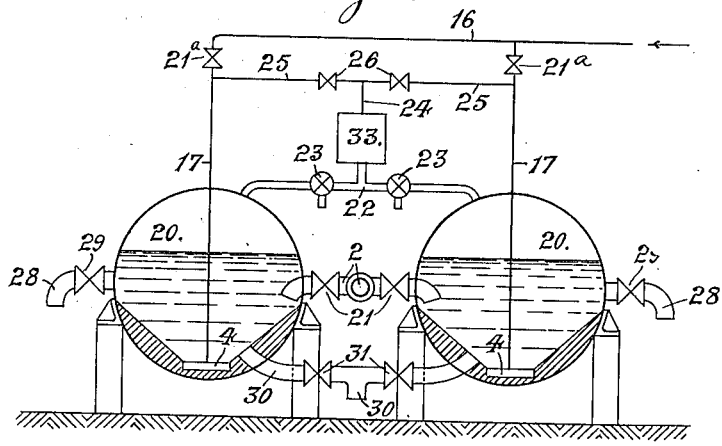

In the case illustrated in Figs. 5 and 6, the tanks would be more suitable for the purification of small quantities of liquid; but this mode of operating may be used in connection with tanks of the circulating type as described, and in any form in which the process of purification by sludge and air is carried on.

Referring to Fig. 5, the tanks 20 are of vertical form; and they are supplied with sewage or liquid through the pipe 2, having cocks 21 on them, for opening and cutting off either one or the other, from the supply. On the air pipes 17 there are valves 21ª; and on a pipe 22 connecting the vessels 20 together, there are three-way valves 23, between which there is a pipe 24—with an air filter 33 on it—leading to a pipe 25 connecting the two pipes 17 below the valves 21ª, and having also two valves 26 on it, one each side of the pipe 24.

It will be readily seen that by opening and closing certain of the valves, air can be passed to the diffuser 4 of one tank or vessel, and that the air rising from the surface of the liquid from this vessel may pass by the pipes 22, 24, 25, and the other pipe 17, into the diffuser 4 of the other tank 20; while the air finally leaving the surface of the liquid in this vessel, can pass by the three-way valve 23 into the air, or shaft or other place of discharge. The purified effluent of a tank, after the contents have settled, can be discharged from the tank through pipe 28, each of which has a valve 29 above it; and the surplus sludge when desired can pass from the tanks through the pipe 30, which has regulating valves 31 upon it. This sludge can be taken from either of the tanks, or from both.

In the arrangement shown in Fig. 6 the metal tanks 20 may be assumed to be cylindrical, or spherical. The mode of action in this case is the same as that described with reference to Fig. 5.

Figure 7:
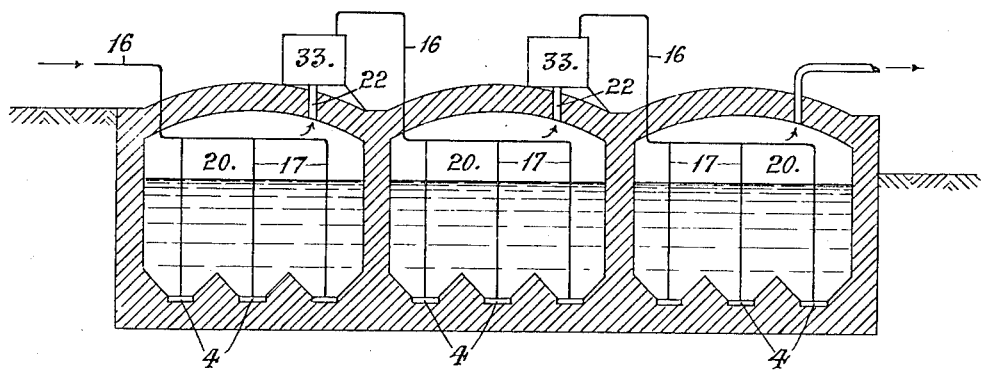
Figure 8:
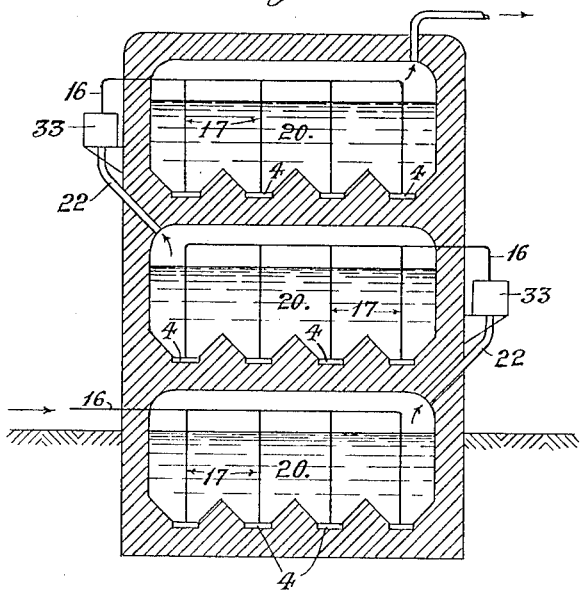

In the diagram Figs. 7 and 8, which may be assumed to be concrete or brickwork tanks, the air, as shown by the diagrams, is taken from the surface of liquid in one tank, and passed through a pipe 22 to a filter 33, and from thence by another pipe 16, to the diffusers' supply pipes of the next tank 20 in series, and so on throughout; and the only difference between these two arrangements, Figs. 7 and 8, is that in Fig. 7 the several tanks are in series horizontally, while in Fig. 8 they are in series vertically, from the bottom upward.

The sewage arriving at a purification plant sometimes varies in its quality or consistency, owing, say, to an abnormal quality of trade waste liquid, having an excess of acidity or alkalinity, being discharged into the sewers; and this will produce a set back in the purifying process by rendering the activity of the bacteria less potent, or by the liquid itself being more difficult to reduce or to effect its purification. To meet this condition, where a series or plurality of purification tanks exist, the plant is so arranged and adapted, that sewage or liquid from one tank can be conducted to, and mixed with the contents of another or others by employing suitable connecting conduits, with controlling valves or penstocks in them, and liquid forcing means.

It is found that if the sewage to be treated is cold, say below about 46° F., that the purifying effect or result deteriorates very materially, especially the nitrification of the sludge. To obviate this, the sewage is artificially warmed by the application of waste heat from any source, such as exhaust steam, or hot gases from furnaces, suction gas or scrubber plants, gas or oil engines, and the like; the hot medium being caused to pass through submerged pipes in the purifying tank.

What is claimed is:—

1. The process of purifying sewage or the like, consisting in delivering air into the sewage to activate the same, permitting such activated sewage to settle, drawing off the liquid, and utilizing the accumulated activated sewage in the subsequent treatment of raw sewage.

2. The hereindescribed process consisting in introducing air into raw sewage, separating the so-activated sludge from the material, and utilizing such activated sludge in addition to the direct air treatment for subsequent treatment of raw sewage.

3. The hereindescribed process consisting in treating sewage with air, separating the activated sludge from the liquid, and adding such activated sludge to the first mentioned air-treatment in the treatment of raw sewage, the activated sludge being mixed with the raw sewage during and by such air treatment.

4. The process of purifying sewage or analogous liquid, consisting in delivering air into the liquid in the presence of bacterial sludge; collecting the air liberated from the sewage or one body of same; and delivering it into and passing it through sewage or liquid in another tank or body.

In testimony whereof I have signed my name to this specification in the presence of two subscribing witnesses.

WALTER JONES.

Witnesses:
ARTHUR BUTWELL,
WILLIAM E. HAND.